US 9,707,643 B2

(12) United States Patent
Barhorst et al.

(10) Patent No.: US 9,707,643 B2
(45) Date of Patent: Jul. 18, 2017

(54) SYSTEMS AND METHODS FOR WELDING ELECTRODES

(71) Applicant: Hobart Brothers Company, Troy, OH (US)

(72) Inventors: Steven Edward Barhorst, Sidney, OH (US); Mario Anthony Amata, Dublin, OH (US)

(73) Assignee: HOBART BROTHERS COMPANY, Troy, OH (US)

( * ) Notice: Subject to any disclaimer, the term of this patent is extended or adjusted under 35 U.S.C. 154(b) by 958 days.

(21) Appl. No.: 13/856,811

(22) Filed: Apr. 4, 2013

(65) Prior Publication Data

US 2013/0270248 A1    Oct. 17, 2013

Related U.S. Application Data

(60) Provisional application No. 61/625,488, filed on Apr. 17, 2012.

(51) Int. Cl.
*B23K 35/40*    (2006.01)
*B23K 35/368*    (2006.01)
(Continued)

(52) U.S. Cl.
CPC ........ *B23K 35/368* (2013.01); *B23K 35/0255* (2013.01); *B23K 35/0261* (2013.01); *B23K 35/0266* (2013.01); *B23K 35/36* (2013.01); *B23K 35/3601* (2013.01); *B23K 35/3602* (2013.01); *B23K 35/362* (2013.01); *B23K 35/3605* (2013.01); *B23K 35/3607* (2013.01); *B23K 35/3608* (2013.01); *B23K 35/406* (2013.01); *Y10T 29/53204* (2015.01)

(58) Field of Classification Search
CPC B23K 35/368; B23K 35/3608; B23K 35/362; B23K 35/3601; B23K 35/0266
USPC ............... 219/145.22, 146.1, 146.31; 148/23
See application file for complete search history.

(56) References Cited

U.S. PATENT DOCUMENTS 3,175,074 A    3/1965    Culbertson
3,643,061 A *    2/1972    Duttera ............... B23K 35/3033
                                              219/146.23
(Continued)

FOREIGN PATENT DOCUMENTS

EP    0595337    5/1994
EP    1710042    10/2006
(Continued)

OTHER PUBLICATIONS

U.S. Appl. No. 13/418,148, filed Mar. 12, 2012, Barhorst et al.
(Continued)

*Primary Examiner* — David Angwin
*Assistant Examiner* — Lawrence Samuels
(74) *Attorney, Agent, or Firm* — Fletcher Yoder P.C.

(57) ABSTRACT

The invention relates generally to welding and, more specifically, to welding wires for arc welding, such as Gas Metal Arc Welding (GMAW) or Flux Core Arc Welding (FCAW). In one embodiment, a tubular welding wire includes a sheath and a core. Further, the core includes a carbon source and an agglomerate having a Group I or Group II compound, silicon dioxide, and titanium dioxide. Additionally, the carbon source and the agglomerate together comprise less than 10% of the core by weight.

2 Claims, 2 Drawing Sheets

(51) Int. Cl.
*B23K 35/36* (2006.01)
*B23K 35/362* (2006.01)
*B23K 35/02* (2006.01)

(56) References Cited

U.S. PATENT DOCUMENTS

| | | | | |
|---|---|---|---|---|
| 3,702,390 | A * | 11/1972 | Blake | B23K 35/368 219/137 R |
| 3,778,588 | A * | 12/1973 | Bishel | B23K 35/3033 219/137 R |
| 3,783,234 | A * | 1/1974 | Russell | B23K 35/0272 219/145.23 |
| 3,787,658 | A * | 1/1974 | Kammer | B23K 35/3605 219/137 PS |
| 3,800,120 | A | 3/1974 | Helton | |
| 3,851,142 | A * | 11/1974 | Bishel | B23K 35/3033 148/26 |
| 3,851,143 | A * | 11/1974 | Bishel | B23K 35/3033 148/26 |
| 3,969,604 | A * | 7/1976 | Baardsen | B23K 15/0046 219/121.64 |
| 4,800,131 | A * | 1/1989 | Marshall | B23K 35/0272 419/3 |
| 4,888,056 | A * | 12/1989 | van der Kolk | B23K 35/226 106/1.17 |
| 5,120,931 | A * | 6/1992 | Kotecki | B23K 35/308 219/146.22 |
| 5,124,530 | A * | 6/1992 | O'Donnell | B23K 35/368 219/146.23 |
| 5,192,851 | A * | 3/1993 | James | B23K 9/09 219/130.51 |
| 5,308,698 | A * | 5/1994 | Bishel | B23K 35/304 219/146.22 |
| 5,369,244 | A * | 11/1994 | Kulikowski | B23K 35/3073 219/145.22 |
| 6,246,008 | B1 * | 6/2001 | Fluckiger | B23K 35/0272 174/126.1 |
| 6,361,739 | B1 * | 3/2002 | Sreshta | B22F 3/225 419/68 |
| 6,440,358 | B1 * | 8/2002 | Sreshta | B22F 3/22 419/14 |
| 6,723,954 | B2 * | 4/2004 | Nikodym | B23K 35/368 219/121.11 |
| 6,784,402 | B2 * | 8/2004 | Kataoka | B23K 9/025 219/146.1 |
| 7,087,860 | B2 | 8/2006 | Nikodym et al. | |
| 7,147,725 | B2 | 12/2006 | Dallam et al. | |
| 7,300,528 | B2 | 11/2007 | Crockett | |
| 2001/0008235 | A1* | 7/2001 | Miszczak | B23K 35/0266 219/146.1 |
| 2002/0153364 | A1* | 10/2002 | North | B23K 35/368 219/137 WM |
| 2004/0187961 | A1* | 9/2004 | Crockett | B23K 35/362 148/23 |
| 2005/0121110 | A1* | 6/2005 | Dallam | B23K 35/365 148/23 |
| 2005/0247688 | A1* | 11/2005 | Burt | B23K 35/0227 219/145.23 |
| 2006/0186103 | A1* | 8/2006 | Rajan | B23K 35/0266 219/145.22 |
| 2006/0196919 | A1* | 9/2006 | James | B23K 35/362 228/223 |
| 2006/0207984 | A1* | 9/2006 | Karogal | B23K 35/406 219/145.22 |
| 2007/0017956 | A1* | 1/2007 | Karogal | B23K 35/3607 228/101 |
| 2008/0029185 | A1* | 2/2008 | Tseng | B23K 35/362 148/23 |
| 2009/0314759 | A1* | 12/2009 | Schaeffer | B23K 35/00 219/145.22 |
| 2010/0147818 | A1* | 6/2010 | Fondriest | B23K 9/0026 219/137 WM |
| 2011/0180523 | A1 | 7/2011 | Ikeda | |
| 2011/0297658 | A1* | 12/2011 | Peters | B23K 9/02 219/162 |

FOREIGN PATENT DOCUMENTS

| | | |
|---|---|---|
| EP | 1728584 | 12/2006 |
| EP | 1733835 | 12/2006 |
| EP | 2341159 | 7/2011 |
| GB | 727463 | 4/1955 |
| JP | S57130796 | 8/1982 |
| JP | H03281092 | 12/1991 |
| JP | H07276086 | 10/1995 |
| JP | 2000301381 | 10/2000 |
| WO | 2013090504 | 6/2013 |
| WO | 2013138175 | 9/2013 |

OTHER PUBLICATIONS

U.S. Appl. No. 13/602,380, filed Sep. 4, 2013, Wenzinger et al.
U.S. Appl. No. 13/743,178, filed Jan. 16, 2013, Barhorst et al.
U.S. Appl. No. 13/743,199, filed Jan. 16, 2013, Barhorst et al.
U.S. Appl. No. 13/837,578, filed Mar. 15, 2013, Hutchison et al.
U.S. Appl. No. 13/681,687, filed Nov. 20, 2012, Pagano et al.
International Search Report from PCT application No. PCT/US2013/036698 dated Oct. 4, 2013, 14 pgs.

* cited by examiner

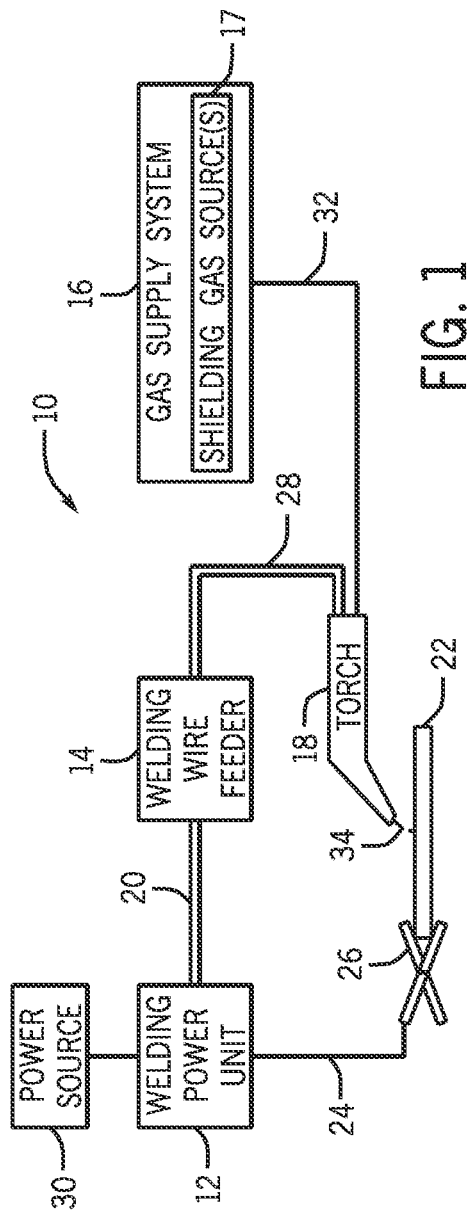
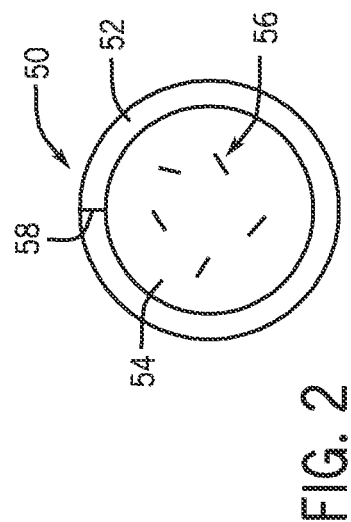

SYSTEMS AND METHODS FOR WELDING ELECTRODES

CROSS-REFERENCE TO RELATED APPLICATION

This application claims priority from and the benefit of U.S. Provisional Application Ser. No. 61/625,488, entitled "SYSTEMS AND METHODS FOR WELDING ELECTRODES," filed Apr. 17, 2012, which is hereby incorporated by reference in its entirety for all purposes.

BACKGROUND

The invention relates generally to welding and, more specifically, to electrodes for arc welding, such as Gas Metal Arc Welding (GMAW) or Flux Core Arc Welding (FCAW). Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Gas-shielded Flux Core Arc Welding (FCAW-G), and Gas Tungsten Arc Welding (GTAW)), typically employ a shielding gas (e.g., argon, carbon dioxide, or oxygen) to provide a particular local atmosphere in and around the welding arc and the weld pool during the welding process, while others (e.g., Flux Core Arc Welding (FCAW), Submerged Arc Welding (SAW), and Shielded Metal Arc Welding (SMAW)) do not. Additionally, certain types of welding may involve a welding electrode in the form of welding wire. Welding wire may generally provide a supply of filler metal for the weld as well as provide a path for the current during the welding process. Furthermore, certain types of welding wire (e.g., tubular welding wire) may include one or more components (e.g., flux, arc stabilizers, or other additives) that may generally alter the welding process and/or the properties of the resulting weld.

BRIEF DESCRIPTION

In one embodiment, a tubular welding wire includes a sheath and a core. Further, the core includes a carbon source and an agglomerate having a Group I or Group II compound, silicon dioxide, and titanium dioxide. Additionally, the carbon source and the agglomerate together comprise less than 10% of the core by weight.

In another embodiment, a granular welding wire core having a carbon source including graphite, carbon black, or lamp black. Further, the granular core includes an agglomerate having potassium oxide or sodium oxide, silicon dioxide, titanium dioxide, and manganese oxide. Further, the carbon source and the agglomerate together comprise less than 10% of the core by weight.

In another embodiment, a method of manufacturing a tubular welding wire includes disposing a core within a metallic sheath. The core includes a carbon source and an agglomerate. Further, the agglomerate includes at least one oxide of each of: a Group I or Group II metal, silicon, and manganese. Additionally, the carbon source and the agglomerate together comprise less than 10% of the tubular welding wire by weight.

DRAWINGS

These and other features, aspects, and advantages of the present invention will become better understood when the following detailed description is read with reference to the accompanying drawings in which like characters represent like parts throughout the drawings, wherein:

FIG. 1 is a block diagram of a gas metal arc welding (GMAW) system, in accordance with embodiments of the present disclosure;

FIG. 2 is a cross-sectional view of a tubular welding electrode, in accordance with embodiments of the present disclosure;

DETAILED DESCRIPTION

Figure 3:
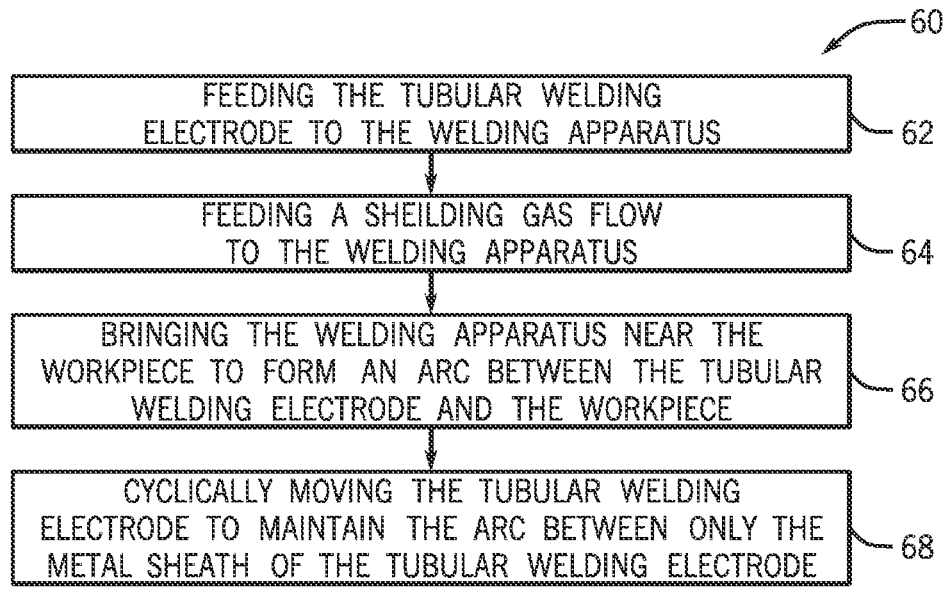
FIG. 3 is a process by which the tubular welding electrode may be used to weld a workpiece, in accordance with embodiments of the present disclosure.

As mentioned, certain types of welding electrodes (e.g., tubular welding wire) may include one or more components (e.g., flux, arc stabilizers, or other additives) that may generally alter the welding process and/or the properties of the resulting weld. For example, the present welding electrode embodiments may include stabilizers, such as carbon compounds, alkali metal compounds, alkaline earth metal compounds, rare earth compounds, and so forth. Additionally, as discussed below, certain stabilizing components of the disclosed welding electrodes may be present in the core of the welding electrodes in the form of an agglomerate. As discussed in detail below, providing one or more stabilizing components as an agglomerate enables the stabilizing compounds to be delivered in a form that is better suited for the weld environment than the non-agglomerated compounds. For example, in certain embodiments, the disclosed arc stabilizing components may provide a "soft arc," which may generally provide suitable heat to the workpiece to fuse portions of the workpiece and/or vaporize the coating (e.g., the zinc coating of galvanized workpieces), even thin workpieces, without resulting in burn-through. In certain embodiments, the "soft arc" provided by the one or more stabilizers of the presently disclosed welding electrodes may enable improved welding of uncoated and coated (e.g., plated, galvanized, painted, aluminized, carburized, or similarly coated) workpieces. Additionally, the present approach may be useful for welding thinner workpieces, such as workpieces having a thickness less than 16 gauge (0.051 in.), less than 20 gauge (0.032 in.), less than 22 gauge (0.25 in.), or approximately 24 gauge (0.02 in.).

It should be appreciated that, as used herein, the term "tubular welding electrode" or "tubular welding wire" may refer to any welding wire or electrode having a metal sheath and a granular or powdered core, such as metal-cored or flux-cored welding electrodes and wires. It should also be appreciated that the term "stabilizer" may be generally used to refer to any component of the tubular welding wire that improves the quality of the arc and/or weld, such as certain disclosed carbon sources, alkali metal compounds, alkaline earth metal compounds, and rare earth compounds.

Turning to the figures, FIG. 1 illustrates an embodiment of a gas metal arc welding (GMAW) system 10 that utilizes a welding electrode (e.g., tubular welding wire) in accordance with the present disclosure. It should be appreciated that, while the present discussion may focus specifically on the GMAW system 10 illustrated in FIG. 1, the presently disclosed welding electrodes may benefit any arc welding process (e.g., FCAW, FCAW-G, GTAW, SAW, SMAW, or similar arc welding process) that uses a welding electrode.

The welding system 10 includes a welding power unit 12, a welding wire feeder 14, a gas supply system 16, and a welding torch 18. The welding power unit 12 generally supplies power to the welding system 10 and may be coupled to the welding wire feeder 14 via a cable bundle 20 as well as coupled to a workpiece 22 using a lead cable 24 having a clamp 26. In the illustrated embodiment, the welding wire feeder 14 is coupled to the welding torch 18 via a cable bundle 28 in order to supply consumable, tubular welding wire (i.e., the welding electrode) and power to the welding torch 18 during operation of welding system 10. In another embodiment, the welding power unit 12 may couple and directly supply power to the welding torch 18.

The welding power unit 12 may generally include power conversion circuitry that receives input power from an alternating current power source 30 (e.g., an AC power grid, an engine/generator set, or a combination thereof), conditions the input power, and provides DC or AC output power via the cable 20. As such, the welding power unit 12 may power the welding wire feeder 14 that, in turn, powers the welding torch 18, in accordance with demands of the welding system 10. The lead cable 24 terminating in the clamp 26 couples the welding power unit 12 to the workpiece 22 to close the circuit between the welding power unit 12, the workpiece 22, and the welding torch 18. The welding power unit 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10. It should be appreciated that the presently disclosed welding electrodes (e.g., tubular welding wire) may enable improvements to the welding process (e.g., improved arc stability and/or improved weld quality) for a number of different power configurations.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In another embodiment, the gas supply system 16 may instead be coupled to the wire feeder 14, and the wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, and so forth). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via conduit 32) may include Ar, Ar/$CO_2$ mixtures, Ar/$CO_2$/$O_2$ mixtures, Ar/He mixtures, and so forth. For example, in certain embodiments, the shielding gas may be a mixture of 75% Ar and 25% $CO_2$ or a mixture of 90% Ar and 10% $CO_2$.

Accordingly, the illustrated welding torch 18 generally receives the welding electrode (i.e., the tubular welding wire), power from the welding wire feeder 14, and a shielding gas flow from the gas supply system 16 in order to perform GMAW of the workpiece 22. During operation, the welding torch 18 may be brought near the workpiece 22 so that an arc 34 may be formed between the consumable welding electrode (i.e., the welding wire exiting a contact tip of the welding torch 18) and the workpiece 22. Additionally, as discussed below, by controlling the composition of the welding electrode (i.e., the tubular welding wire), the chemistry of the arc 34 and/or the resulting weld (e.g., composition and physical characteristics) may be varied. For example, the welding electrode may include fluxing and/or alloying components that may affect the mechanical properties of the weld. Furthermore, certain components of the welding electrode (i.e., welding wire) may also provide additional shielding atmosphere near the arc, affect the transfer properties of the arc, and/or deoxidize the surface of the workpiece, and so forth.

A cross-section of an embodiment of the presently disclosed welding wire is illustrated in FIG. 2. The tubular welding wire 50 illustrated in FIG. 2 includes a metallic sheath 52 that encapsulates a granular or powdered core 54. The metallic sheath 52 may be manufactured from any suitable metal or alloy (e.g., high-carbon steel, low-carbon steel, or other suitable metal or alloy). It should be appreciated that since the metallic sheath 52 may generally provide a portion of the filler metal for the weld, the composition of the metallic sheath 52 may affect the composition of the resulting weld. As such, the metallic sheaths 52 may include additives or impurities (e.g., carbon, alkali metals, manganese, nickel, copper, or similar compounds or elements) that may be selected to provide desired weld properties.

The granular core 54 of the illustrated tubular welding wire 50 may generally be a compacted powder with a composition that, as discussed below, may include one or more stabilizing components. For example, to stabilize the arc 34, certain embodiments of the granular core 54 may include one or more of: a carbon source, an alkali metal compound or agglomerate, an alkaline earth metal compound or agglomerate, and a rare earth compound. Further, in certain embodiments, the stabilizers (e.g., a carbon source and one or more stabilizing agglomerates) may account for approximately 10% or less of granular core by weight. The various components of the granular core 54 may be disposed homogenously or non-homogenously (e.g., in clumps or clusters 56) within the granular core 54. As set forth in detail below, one or more of the stabilizing components of the granular core 54 (e.g., one or more alkali metal compounds and/or alkaline earth metal compounds) may be provided in the form of an agglomerate or frit within the granular core 54. Additionally, for certain welding electrode embodiments (e.g., a metal-cored welding electrode), the granular core 54 may include one or more metals (e.g., iron, nickel, copper, high-carbon iron powder, ferro-molybdenum powder, or other suitable metals) that may provide at least a portion of the filler metal for the weld. Examples of other components that may be present within the tubular welding wire 50 include other stabilizing, fluxing, and alloying components, such as may be found in METALLOY X-CEL™ welding electrodes available from Illinois Tool Works, Inc.

Generally speaking, in certain embodiments, the total percentage of the combination of the stabilizers (e.g., one or more carbon sources, alkali metal compounds, alkaline earth metal compounds, and/or rare earth compounds) in the tubular welding wire 50 may be between approximately 0.01% and approximately 10% by weight relative to the granular core 54 or the entire tubular welding wire 50. For example, in certain embodiments, the total percentage of the combination of the one or more stabilizers may be between approximately 0.01% and approximately 8%, between approximately 0.05% and approximately 5%, or between approximately 0.1% and approximately 4% by weight relative to the granular core 54 or the entire tubular welding wire 50. It should be appreciated that, under the conditions of the arc 34, the components of the welding wire (e.g., the metal sheath 52, the granular core 54, and so forth) may change physical state, chemically react (e.g., oxidize, decompose, and so forth), or become incorporated into the weld substantially unmodified by the weld process.

The carbon source present in the granular core 54 and/or the metal sheath 52 may be in a number of forms and may stabilize the arc 34 and/or increase the carbon content of the weld. For example, in certain embodiments, graphite, graphene, nanotubes, fullerenes or similar substantially $sp^2$-hybridized carbon source may be utilized as the carbon source in the tubular welding wire 50. Furthermore, in certain embodiments, graphene or graphite may be used to also provide other components (e.g., moisture, gases, metals, and so forth) that may be present in the interstitial space between the sheets of carbon. In other embodiments, substantially $sp^3$-hybridized carbon sources (e.g., micro- or nano-diamond, carbon nanotubes, buckyballs) may be used as the carbon source. In still other embodiments, substantially amorphous carbon (e.g., carbon black, lamp black, soot, or similar amorphous carbon sources) may be used as the carbon source. Furthermore, while the present disclosure may refer to this component as a "carbon source," it should be appreciated that the carbon source may be a chemically modified carbon source that may contain elements other than carbon (e.g., oxygen, halogens, metals, and so forth). For example, in certain embodiments, the tubular welding wire 50 may include a carbon black carbon source (e.g., in the granular core 54 and/or the metallic sheath 54) that may contain a manganese content of approximately 20%. Additionally, in certain embodiments, the carbon source may account for between approximately 0.01% and 9.9%, between approximately 0.05% and 5%, between approximately 0.1% and 3%, between approximately 0.25% and 2%, between approximately 0.4% and 1%, or approximately 0.5% of the granular core 54 by weight.

Additionally, the tubular welding wire 50 may also include one or more alkali metal and/or alkaline earth metal compounds to stabilize the arc 34. That is, the granular core 54 of the tubular welding wire 50 may include one or more compounds of the Group 1 and Group 2 elements, i.e., lithium (Li), sodium (Na), potassium (K), rubidium (Rb), cesium (Cs), beryllium (Be), magnesium (Mg), calcium (Ca), strontium (Sr), or barium (Ba). A non-limiting list of example compounds include: Group 1 (i.e., alkali metal) and Group 2 (i.e., alkaline earth metal) silicates, titanates, manganese titanate, alginates, carbonates, halides, phosphates, sulfides, hydroxides, oxides, permanganates, silicohalides, feldspars, pollucites, molybdenites, and molybdates. For example, in an embodiment, the granular core 54 of the tubular welding wire 50 may include potassium manganese titanate, potassium sulfate, sodium feldspar, potassium feldspar, and/or lithium carbonate. Similar examples of carbon sources and alkali metal compounds that may be used are described in U.S. Pat. No. 7,087,860, entitled "STRAIGHT POLARITY METAL CORED WIRES," and U.S. Pat. No. 6,723,954, entitled "STRAIGHT POLARITY METAL CORED WIRE," which are both incorporated by reference in their entirety for all purposes. Furthermore, in certain embodiments, the aforementioned Group 1 and Group 2 compounds may be disposed directly within the core 54 of the tubular welding wire 50, while in other embodiments, the aforementioned Group 1 and Group 2 compounds may be used to form an agglomerate, as set forth in detail below. It should be appreciated that certain of the aforementioned compounds may be converted into another type of compound during the agglomeration process (e.g., potassium carbonate may become potassium oxide).

Additionally, the tubular welding wire 50 may also include other stabilizing components. In particular, rare earth compounds (e.g., rare earth silicides, rare earth oxides, and so forth) may generally provide stability to the arc 34 and may affect the properties of the resulting weld. Accordingly, certain embodiments of the presently disclosed welding wire may include one or more rare earth compounds (e.g., compounds of lanthanum (La), cerium (Ce), praseodymium (Pr), neodymium (Nd), promethium (Pm), samarium (Sm), europium (Eu), gadolinium (Gd), or other suitable rare earth metals). A non-limiting list of example compounds include: rare earth silicides, oxides, silicates, titanates, alginates, carbonates, halides, phosphates, sulfides, hydroxides, permanganates, silicohalides, feldspars, pollucites, molybdenites, and molybdates. For example, in certain embodiments, the tubular welding wire 50 may use rare earth silicides, such as the Rare Earth Silicide (e.g., available from Miller and Company of Rosemont, Ill.), which may include rare earth elements (e.g., cerium). By further example, in certain embodiments, the tubular welding wire 50 may include one or more oxides of a rare earth element (e.g., cerium oxide, lanthanum oxide, samarium oxide and so forth) to provide stability to the arc 34 during the welding operation. As discussed in detail below, in certain embodiments, the rare earth compounds used in conjunction with an agglomerate (e.g., with an alkali metal compound and/or an alkaline earth metal compound) to provide a combined stabilizing effect to the arc.

Furthermore, the tubular welding wire 50 may, additionally or alternatively, include other elements and/or minerals to control the chemistry of the resulting weld. For example, in certain embodiments, the granular core 54 and/or the metallic sheath 52 of the tubular welding wire 50 may include certain elements (e.g., titanium, manganese, zirconium, fluorine, or other elements) and/or minerals (e.g., pyrite, magnetite, and so forth). By specific example, certain embodiments may include zirconium silicide, nickel zirconium, or alloys of titanium, aluminum, and/or zirconium in the granular core 54. In particular, sulfur containing compounds, including various sulfide, sulfate, and/or sulfite compounds (e.g., such as molybdenum disulfide, iron sulfide, manganese sulfite, barium sulfate, calcium sulfate, or potassium sulfate) or sulfur-containing compounds or minerals (e.g., pyrite, gypsum, or similar sulfur-containing species) may be included in the granular core 54 to improve the quality of the resulting weld by improving bead shape and facilitating slag detachment, which may be especially useful when welding galvanized workpieces, as discussed below. Furthermore, in certain embodiments, the granular core 54 of the tubular welding wire 50 may include multiple sulfur sources (e.g., manganese sulfite, barium sulfate, and pyrite), while other embodiments of the tubular welding wire 50 may include only a single sulfur source (e.g., pyrite or iron sulfide) without including a substantial amount of another sulfur source (e.g., potassium sulfate).

Furthermore, in certain embodiments of the presently disclosed tubular welding wire 50, a number of stabilizing components (e.g., one or more alkali metal compounds and/or alkaline earth metal compounds) may be present in the granular core 54 as an agglomerate or frit. For example, certain embodiments of the tubular welding wire 50 may include an agglomerate or frit having one or more of an alkali metal compound and an alkaline earth metal compound, together with one or more binding (e.g., potassium silicate, sodium silicate, or combinations thereof) and/or drying agents (e.g., lithium fluoride). The term "agglomerate" or "frit," as used herein, refers to a mixture of compounds that have been fired or heated in a calciner or oven such that the components of the mixture are in intimate contact with one another. It should be appreciated that the agglomerate may have subtly or substantially different chemical and/or physical properties than the individual components of the mixture used to form the agglomerate. For example, in certain embodiments, mixing and then agglomerating potassium carbonate, sand, and rutile may provide an agglomerate that includes a mixture of potassium oxide, silica, and titanium dioxide after firing.

Agglomerating certain stabilizing components (e.g., one or more alkali metal compounds, alkaline earth metal compounds, or any other suitable stabilizing components) into a frit, as presently disclosed, may deliver these stabilizing compounds in a form that is better suited for the weld environment than the non-agglomerated compounds. While not desiring to be bound to theory, one manner in which the agglomerate may improve the chemical and/or physical properties of the granular core 54 is by ensuring that the agglomerated stabilizing components remain dry (e.g., absorbing little or no moisture from the atmosphere or surrounding environment) before being introduced into the conditions of the welding arc 34. Further, another manner in which the agglomerate may improve the chemical and/or physical properties of the granular core 54 is by enabling the stabilizing components to have particular relative ratios and localized concentrations during delivery to the welding arc 34.

In certain embodiments, the granular core 54 of the tubular welding wire 50 may include an agglomerate having one or more alkali metal compounds (e.g., potassium oxide, sodium oxide, or another suitable alkali metal compound) and/or one or more alkaline earth metal compounds (e.g., magnesium oxide, calcium oxide, or another suitable alkaline earth metal compound). For example, in certain embodiments, the granular core 54 may include an agglomerate including a combination of potassium oxide and sodium oxide. In certain embodiments, the granular core 54 of the tubular welding wire 50 may also include an agglomerate comprising other oxides (e.g., silicon dioxide, titanium dioxide, manganese dioxide, or other suitable metal oxides) and/or certain drying or binding agents (e.g., silicates, lithium fluoride, and so forth) as well. For example, one embodiment of a tubular welding wire 50 may include an agglomerate including a mixture of potassium oxide, silica, and titania. By specific example, certain embodiments of a tubular welding wire 50 may include an agglomerate in the granular core 54 (e.g., between approximately 1% and approximately 10% of the granular core, or approximately 2% of the granular core), and the agglomerate may include a mixture of potassium oxide (e.g., between approximately 22% and 25% by weight of stabilizing agglomerate), silica (e.g., between approximately 10% and 18% by weight of the stabilizing agglomerate), titania (e.g., between approximately 38% and 42% by of weight the stabilizing agglomerate), and manganese oxide or manganese dioxide (e.g., between approximately 16% and 22% by weight of the stabilizing agglomerate).

In certain embodiments, the granular core 54 of the tubular welding wire 50 may include an agglomerate having one or more alkali metal compounds (e.g., sodium oxide, potassium oxide, or other suitable alkali metal compound) and zero or more alkaline earth metal compounds (e.g., magnesium oxide, calcium oxide, or other suitable alkaline earth metal compounds) that together account for between approximately 5% and 75% of the weight of the agglomerate. In other embodiments, the one or more alkali metal compounds and zero or more alkaline earth metal compounds may account for between approximately 5% and 95% of the agglomerate by weight. Furthermore, in certain embodiments, other chemical and/or physical factors (e.g., maximizing alkali metal and/or alkaline earth metal loading, acidity, stability, and/or hygroscopicity of the agglomerate) may be considered when selecting the relative amounts of each component present in the agglomerate. Additionally, in certain embodiments, the agglomerate may account for between approximately 0.01% and approximately 9.9%, between approximately 0.05% and approximately 5%, between approximately 0.1% and approximately 4%, between approximately 1% and approximately 3%, between approximately 1.5% and approximately 2.5%, or approximately 2% of the granular core 54 by weight.

Generally speaking, the tubular welding wire 50 may generally stabilize the formation of the arc 34 to the workpiece 22. As such, the disclosed tubular welding wire 50 may improve deposition rates while reducing splatter during the welding process. It should further be appreciated that the improved stability of the arc 34 may generally enable the welding of coated metal workpieces. A non-limiting list of example coated workpieces includes painted, sealed, galvanized, galvanealed, plated (e.g., nickel-plated, copper-plated, tin-plated, or electroplated or chemically plated using a similar metal), chromed, nitrite-coated, aluminized, or carburized workpieces. For example, in the case of galvanized workpieces, the presently disclosed tubular welding wire 50 may generally improve the stability and the penetration of the arc 34 such that a good weld may be achieved despite the zinc coating on the outside of the workpiece 22. Additionally, by improving the stability of the arc 34, the disclosed tubular welding wire 50 may generally enable the welding of thinner workpieces than may be possible using other welding electrodes. For example, in certain embodiments, the disclosed tubular welding wire 50 may be used to weld metal having an approximately 16-, 20-, 22-, 24-gauge, or even thinner workpieces.

Furthermore, the disclosed tubular welding wire 50 may also be combined with certain welding methods or techniques (e.g., techniques in which the welding electrode moves in a particular manner during the weld operation) that may further increase the robustness of the welding system 10 for particular types of workpieces. For example, in certain embodiments, the welding torch 18 may be configured to cyclically or periodically move the electrode in a desired pattern (e.g., a circular, spin arc, or serpentine pattern) within the welding torch 18 in order to maintain an arc 34 between the tubular welding wire 50 and the workpiece 22 (e.g., only between the sheath 52 of the tubular welding wire 50 and the workpiece 22). By specific example, in certain embodiments, the disclosed tubular welding wire 50 may be utilized with welding methods such as those described in U.S. patent application Ser. No. 13/681,687, entitled "DC ELECTRODE NEGATIVE ROTATING ARC WELDING METHOD AND SYSTEM," which is incorporated by reference herein in its entirety for all purposes. It should be appreciated that such welding techniques may be especially useful when welding thin workpieces (e.g., having 16-, 20-, 22-, 24-gauge, or even thinner thickness), as mentioned above.

FIG. 3 illustrates an embodiment of a process 60 by which a workpiece 22 may be welded using the disclosed welding system 10 and tubular welding wire 50 (e.g., tubular welding electrode 50). The illustrated process 60 begins with feeding (block 62) the tubular welding electrode 50 (i.e., the welding wire 50) to a welding apparatus (e.g., welding torch 18). Additionally, the process 60 includes providing (block 64) a shielding gas flow (e.g., 100% argon, 75% argon/25% carbon dioxide, 90% argon/10% helium, or similar shielding gas flow) near the contact tip of the welding apparatus (e.g., the contact tip of the torch 18). In other embodiments, welding systems may be used that do not use a gas supply system (e.g., such as the gas supply system 16 illustrated in FIG. 1) and one or more components (e.g., aluminum, iron, or magnesium oxides) of the tubular welding electrode 50 may provide a shielding gas component. Next, the tubular welding electrode 50 may be brought near (block 66) the workpiece 22 such that an arc 34 may be formed between the tubular welding electrode 50 and the workpiece 22. It should be appreciated that the arc 34 may be produced using, for example, a DCEP, DCEN, DC variable polarity, pulsed DC, balanced or unbalanced AC power configuration for the GMAW system 10. Furthermore, as mentioned above, in certain embodiments, the tubular welding electrode 50 may be cyclically or periodically moved (block 68) relative to the workpiece 22 according to a particular pattern and/or geometry (e.g., spinning arc, whirling pattern, or serpentine pattern) such that the arc 34 may be maintained (e.g., substantially between the metal sheath 52 of the tubular welding electrode 50 and the workpiece 22) during the welding process. Additionally, in certain embodiments, the tubular welding electrode 50 and/or the cyclical motion of the tubular welding electrode 50 during welding may generally enable the welding of thinner (e.g., less than 20 gauge) workpieces as well as painted, galvanized, galvanealed, plated, aluminized, chromed, carburized, or other similar coated workpieces.

Figure 4:
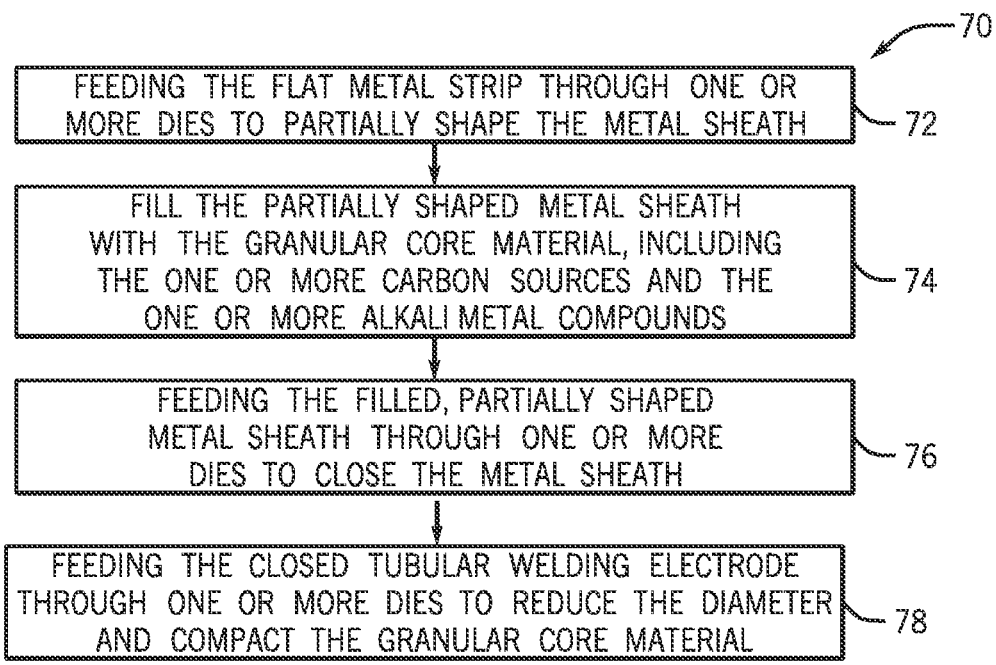
FIG. 4 is a process for manufacturing the tubular welding electrode, in accordance with embodiments of the present disclosure.

FIG. 4 illustrates an embodiment of a process 70 by which the tubular welding wire 50 may be manufactured. The process 70 begins with a flat metal strip being fed (block 72) through a number of dies that shape the strip into a partially circular metal sheath 52 (e.g., producing a semicircle or trough). After the metal strip has been at least partially shaped into the metal sheath 52, it may be filled (block 74) with the granular core material 54. Accordingly, the partially shaped metal sheath 52 may be filled with various powdered fluxing and alloying components (e.g., iron oxide, zinc metal, or similar fluxing and/or alloying components). Additionally, in certain embodiments, the stabilizing components (e.g., the one or more carbon sources, and/or one or more alkali metal compounds, and/or one or more alkaline earth metal compounds, and/or one or more rare earth metal compounds) may be added such that together they comprise less than 10% of the tubular welding wire 50 and/or the granular core material 54 by weight. Additionally, as set forth above, in certain embodiments, an alkali metal compound, and/or an alkaline earth metal compound may be present in the granular core 54 in the form of an agglomerate. Furthermore, in certain embodiments, other components (e.g., rare earth silicide, magnetite, titanate, pyrite, iron powders, and/or other similar components) may also be present in the granular core 54 being added to the partially shaped sheath.

By specific example, in an embodiment, the granular core 54 may include (by weight) approximately 71.6% iron powder, approximately 1.1% iron titanium powder, approximately 17.1% silico-manganese powder, approximately 4.0% iron silicon powder, approximately 0.4% iron sulfide (e.g., pyrite), approximately 0.5% graphite, approximately 3.3% rare earth silicide, and approximately 2% of an agglomerate. Further, the silico-manganese powder, also known as ferro-manganese silicon, may include approximately 62% manganese, approximately 30% silicon, and approximately 8% iron by weight of the silico-manganese powder. Additionally, in such an embodiment, the agglomerate may include (by weight of the agglomerate) between approximately 22% and approximately 25% potassium oxide and/or sodium oxide, between approximately 16% and approximately 22% manganese oxide or manganese dioxide, between approximately 10% and approximately 18% silicon dioxide, and between approximately 38% and approximately 42% titanium dioxide. Further, in certain embodiments, as set forth above, a rare earth metal silicide or a rare earth metal oxide may be included in the granular core 54 along with the agglomerate, for example, to stabilize the arc. Certain other embodiments of the granular core 54 may have a similar formula, but may vary (e.g., by approximately 5% or less) from the values listed above.

Once the components of the granular core 54 have been added to the partially shaped metal sheath 52, the partially shaped metal sheath 52 may then be fed through (block 76) one or more devices (e.g., dies) that may generally close the metal sheath 52 such that it substantially surrounds the granular core material 54 (e.g., forming a seam 58). Additionally, the closed metal sheath 52 may subsequently be fed through (block 78) a number of drawing devices (e.g., drawing dies) to reduce the diameter of the tubular welding wire 50 by compressing the granular core material 54.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A tubular welding wire for joining steel workpieces via arc welding and having a steel sheath disposed around a core, wherein the core consists essentially of:
   iron powder;
   iron titanium powder;
   silico-manganese powder;
   iron silicon powder;
   iron sulfide;
   graphite;
   rare earth silicide; and
   an frit, wherein the frit comprises a Group I or Group II compound, silicon dioxide, and titanium dioxide, and wherein the graphite and the frit together comprise less than 10% of the core by weight.

2. The tubular welding wire of claim 1, wherein the core consists essentially of:
   72% iron powder;
   1% iron titanium powder;
   17% silico-manganese powder;
   4% iron silicon powder;
   0.4% iron sulfide;
   0.5% graphite;
   3% rare earth silicide; and
   2% of the frit by weight.

* * * * *